United States Patent
Sotnikov

(10) Patent No.: US 11,445,225 B2
(45) Date of Patent: Sep. 13, 2022

(54) MEASURING AND IMPROVING ORIGIN OFFLOAD AND RESOURCE UTILIZATION IN CACHING SYSTEMS

(71) Applicant: Akamai Technologies Inc., Cambridge, MA (US)

(72) Inventor: Dmitry Sotnikov, Rishon Lezion (IL)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 17/081,329

(22) Filed: Oct. 27, 2020

(65) Prior Publication Data

US 2022/0132182 A1  Apr. 28, 2022

(51) Int. Cl.
*H04N 21/231* (2011.01)
*H04N 21/2183* (2011.01)
*H04N 21/2665* (2011.01)
*H04N 21/226* (2011.01)
*H04L 9/06* (2006.01)

(52) U.S. Cl.
CPC ..... *H04N 21/23106* (2013.01); *H04L 9/0643* (2013.01); *H04N 21/2183* (2013.01); *H04N 21/226* (2013.01); *H04N 21/2665* (2013.01)

(58) Field of Classification Search
CPC ............. H04N 21/2665; H04N 21/226; H04N 21/2183; H04N 21/23106; H04L 9/0643
See application file for complete search history.

(56) References Cited

U.S. PATENT DOCUMENTS

| | | |
|---|---|---|
| 6,108,703 A | 8/2000 | Leighton et al. |
| 6,262,987 B1 * | 7/2001 | Mogul ............. H04L 61/15 370/400 |
| 7,058,706 B1 | 6/2006 | Iyer et al. |
| 7,096,263 B2 | 8/2006 | Leighton et al. |
| 7,096,266 B2 | 8/2006 | Lewin et al. |
| 7,240,100 B1 | 7/2007 | Wein et al. |
| 7,251,688 B2 | 7/2007 | Leighton et al. |
| 7,274,658 B2 | 9/2007 | Bornstein et al. |
| 7,293,093 B2 | 11/2007 | Leighton et al. |
| 7,376,716 B2 * | 5/2008 | Dilley ............. H04L 29/06 711/122 |

(Continued)

OTHER PUBLICATIONS

Wikipedia, "HyperLogLog", downloaded on Oct. 8, 2020, 3 pages, https://en.wikipedia.org/wiki/HyperLogLog.

(Continued)

*Primary Examiner* — James R Sheleheda

(57) ABSTRACT

Origin offload is a key performance indicator of a content delivery network (CDN). This patent document presents unique methods and systems for measuring origin offload and applying those measurements to improve the offload. The techniques presented herein enable resource-efficient measurement of origin offload by individual servers and aggregation and analysis of such measurements to produce significant insights. The teachings hereof can be used to better identify root causes of suboptimal offload performance, to tune CDN settings and configurations, and to modify network operations, deployment and/or capacity planning. In addition, discussed herein are improved metrics showing offload in relation to the maximum achievable offload for the particular traffic being served.

10 Claims, 11 Drawing Sheets

(56) References Cited

U.S. PATENT DOCUMENTS

| | | | |
|---|---|---|---|
| 7,484,002 B2 | 1/2009 | Swildens et al. | |
| 7,523,181 B2 | 4/2009 | Swildens et al. | |
| 7,574,499 B1 | 8/2009 | Swildens et al. | |
| 7,603,439 B2 | 10/2009 | Dilley et al. | |
| 7,716,367 B1 | 5/2010 | Leighton et al. | |
| 7,725,602 B2 | 5/2010 | Liu et al. | |
| 7,912,978 B2 | 3/2011 | Swildens et al. | |
| 7,925,713 B1 | 4/2011 | Day et al. | |
| 7,996,531 B2 | 8/2011 | Freedman | |
| 8,180,720 B1 | 5/2012 | Kovacs et al. | |
| 8,195,831 B2 | 6/2012 | Swildens et al. | |
| 8,447,948 B1* | 5/2013 | Erdogan | G06F 12/0871 711/159 |
| 8,788,783 B1* | 7/2014 | Karnati | G06F 12/084 711/170 |
| 9,654,623 B1* | 5/2017 | Kolazhi | H04L 41/0889 |
| 2002/0087797 A1* | 7/2002 | Adrangi | G06F 12/0888 707/E17.12 |
| 2012/0239811 A1* | 9/2012 | Kohli | H04L 67/2814 709/226 |
| 2014/0280679 A1* | 9/2014 | Dey | H04L 67/322 709/213 |
| 2015/0081981 A1* | 3/2015 | McKean | G06F 12/0871 711/136 |
| 2015/0100660 A1* | 4/2015 | Flack | H04L 67/2842 709/213 |
| 2015/0100664 A1* | 4/2015 | Flack | H04L 67/2852 709/213 |
| 2017/0017575 A1* | 1/2017 | Razin | G06F 12/0868 |
| 2019/0109926 A1* | 4/2019 | Hotchkies | H04L 67/327 |
| 2019/0116207 A1* | 4/2019 | Lermant | H04L 65/104 |

OTHER PUBLICATIONS

Bar-Yossef, Z. et al., "Counting distinct elements in a data stream", 10 pages, downloaded Jul. 7, 2020 from http://webee.technion.ac.il/Sites/People/zivby/papers/f0/f0.ps.

Sundarrajan, A. and Kasbekar, M., et al., "Footprint Descriptors Theory and Practice of Cache Provisioning in a Global CDN", In Proceedings of CoNEXT '17, Incheon, Republic of Korea, Dec. 12-15, 2017, 13 pages.

Waldspurger, C. et al., "Cache Modeling and Optimization using Miniature Simulations", Jul. 12-14, 2017, 13 pages, Proceedings of the 2017 USENIX Annual Technical Conference (USENIX ATC '17), https://www.usenix.org/conference/atc17/technical-sessions/presentation/waldspurger.

Xie, F. et al., "Estimating Duplication by Content-based Sampling", 2013 USENIX Annual Technical Conference (USENIX ATC '13), 6 pages.

U.S. Appl. No. 17/081,691, filed Oct. 27, 2020.

Transmittal Letter filed with SIDS, 2 pages, Jun. 10, 2022.

Bar-Yossef, Z et al., "Counting distinct elements in a data stream", 10 pages, RANDOM conference 2002, (downloaded Jun. 2022 from http://webee.technion.ac.il/Sites/People/zivby/papers/f0/f0.ps).

Ziv Bar-Yossef: Publications, web page located at https://webee.technion.ac.il/Sites/People/zivby/papers/#Papers (downloaded Jun. 10, 2022, 3 pages.

* cited by examiner

Algorithm 1 Stack algorithm

1: N = sizeof(stack)-1
2: for i in 1 to N do
3:   evictionAge = i · T
4:   fingerprintSet1 = null
5:   requestsServed = 0
6:   for j in 1 to i do
7:     x = stack.entryAt((N+1)-j)
8:     fingerprintSet1.insert (x.fingerprint)
9:     requestsServed += x.requests
10:   x = stack.entryAt((N+1))
11:   requestsServed += x.requests
12:   fingerprint1 = merge(fingerprintSet1)
13:   fingerprintSet2 = fingerprintSet1.insert(x.fingerprint)
14:   fingerprint2 = merge(fingerprintSet2)
15:   cachesize = estimatedUniqueObjectCount(fingerprint1)
16:   cacheMissRate = (estimatedUniqueObjectCount(fingerprint2) - estimatedUniqueObjectCount(fingerprint1)) / requestsServed
17:   print (evictionAge, cachesize, cacheMissRate)

*FIG. 6*

Chosen cache space is 101.73 TB. Eviction age is 29.88 hrs.

Cache space occupied = 106.56 TB, hitrate = 65.3%

MEASURING AND IMPROVING ORIGIN OFFLOAD AND RESOURCE UTILIZATION IN CACHING SYSTEMS

BACKGROUND

Technical Field

This application generally relates to content delivery and to the caching content to offload origin servers.

Brief Description of the Related Art

Content delivery networks (CDNs) typically use cache servers to improve the delivery of websites, web applications, and other online content such as streaming media. A CDN usually has many such cache servers distributed across the Internet, e.g., located in end user access networks, peering points, or otherwise. An end user client desiring content under a hostname being handled by the CDN is directed to a cache server, or cluster thereof, in the CDN. This may be accomplished using a DNS-based request routing mechanism, in which the CDN's domain name service returns an IP address of a selected cluster or server in response to a name lookup for the hostname. Such techniques are known in the art.

Due to the aforementioned request routing mechanism, the end-user client makes a content request for a desired object to a selected cache server in the CDN, for example using HTTP or other application layer protocol. The cache server maintains a local cache of content (also referred to, equivalently, as an 'object' cache). Typical object types that are stored in a cache include, without limitation, markup language documents, images, video segments, scripts, CSS files, JSON objects, and API data. Cached objects may also comprise records fetched from an origin database, such as product catalog, shipping records, inventory status, flight records, or any other kind of record. The cache server searches this cache for the requested object. If it locates the requested object and that cached object is not expired (TTL not expired) and otherwise valid to serve (cache hit), the end-user client request can be served out of cache. If not (cache miss), the cache server generally needs to fetch the object from an upstream server, which may be, for example, a parent server in the CDN (e.g., using a cache hierarchy model, as described in U.S. Pat. No. 7,603,439), or an origin server associated with the content provider that is associated with the hostname of the requested object. In this way, the content provider can make its website, web application, enterprise tool, or other online property available to end-users via the CDN in an improved fashion.

To fetch content from upstream, the cache server issues what is often referred to as a 'forward request'. After retrieving the content from the parent, or origin, or otherwise from an upstream server, the cache server can serve it to the end-user client and cache the object for a time period (e.g., as indicated by a time to live or TTL) to be locally available to satisfy future client requests. Serving from cache is desirable. It is undesirable to be fetching objects from the origin infrastructure in particular, because doing so increases response time for the end user, increases network traffic, and increases load (decreases offload) on the origin infrastructure. Hence it is desirable to increase the cache hit ratio achieved by a cache server—or more generally, the cache hit ratio achieved by a content delivery network with many such caches.

As suggested by the above, origin offload is a key performance indicator of a CDN. A well-known way to measure offload is to calculate the ratio between the number of cache hits (CDN cache hits) versus total number of served requests (for cacheable data only):

$$\frac{\#\text{cache\_hits}}{\#\text{total\_num\_of\_requests}}$$

The above formula produces a number between 0 and 1, where higher is better. The same concept can be expressed in an alternative way, which is more useful for the teachings of this patent document.

$$\frac{\#\text{total\_num\_of\_requests} - \#\text{origin\_hits}}{\#\text{total\_num\_of\_requests}}$$

It is easy to calculate this metric, as it requires maintaining a record of only two counters in a caching system: #origin_hits, and #total_num_of_requests. But it obscures offloading problems if they exist, and makes it hard to resolve them. For example, if the #total_num_of_requests=1000 and #origin_hits=300 then the origin offloading will be calculated as 0.7, meaning that 70% of requests were served without access to the origin, that is overall not bad, but not clear if a better ratio can be achieved by spending more resources on it, or not. The problem also exists when the offloading is poor: for example if the offloading is 0.3 it is not clear what to do to improve it, and if it is even possible.

Knowing the maximum possible offloading that can be achieved by the CDN in a given situation—referred to herein as the "maximal" offload—and the current offload ratio solves the problem, since it not only reveals the gap but also shows the potential improvement that can be achieved by closing that gap. However, feasible techniques for determining such a maximal offload are unknown, which is why historically that metric has not been used.

The teachings hereof present techniques that can be used, in methods and systems, to efficiently compute an estimate of maximal offload in a cache system, such as a CDN, based on real traffic, and further they illustrate how such estimations can be used to improve the content delivery provided thereby.

As a result, the teachings presented herein improve the functioning of a computer system itself, improving the caching function in an individual server as well as that of a larger distributed system comprised of many such servers. Those skilled in the art will understand these and other improvements from the teachings hereof.

More information about CDN technologies, including examples of request routing mechanisms using DNS and otherwise, as well as cache server technologies, can be found in the following documents, the teachings of which are hereby incorporated by reference in their entireties: U.S. Pat. Nos. 6,108,703; 7,293,093; 7,096,263; 7,096,266; 7,484,002; 7,523,181; 7,574,499; 7,240,100; 7,603,439; 7,725,602; 7,716,367; 7,996,531; 7,925,713; 7,058,706; 7,251,688; 7,274,658; 7,912,978; 8,195,831.

While a CDN can help deliver non-cacheable objects, the teachings hereof relate to cacheable objects.

BRIEF SUMMARY

This section describes some pertinent aspects of this invention. Those aspects are illustrative, not exhaustive, and they are not a definition of the invention. The claims of any issued patent define the scope of protection.

Origin offload is a key performance indicator of a content delivery network (CDN). This patent document presents unique methods and systems for measuring origin offload and applying those measurements to improve the offload. The techniques presented herein enable resource-efficient measurement of origin offload by individual servers and aggregation and analysis of such measurements to produce significant insights. The teachings hereof can be used to better identify root causes of suboptimal offload performance, to tune CDN settings and configurations, and to modify network operations, deployment and/or capacity planning. In addition, discussed herein are improved metrics showing offload in relation to the maximum achievable offload for the particular traffic being served.

The claims are incorporated by reference into this section.

BRIEF DESCRIPTION OF THE DRAWINGS

The invention will be more fully understood from the following detailed description taken in conjunction with the accompanying drawings, in which:

FIG. 6 is a block of pseudo-code describing a method for a stack algorithm, in accord with the teachings hereof; and, FIG. 7 is an example of a graph showing the relationship between cache byte hit rate and cache space, in connection with a footprint descriptor;

Figure 1:
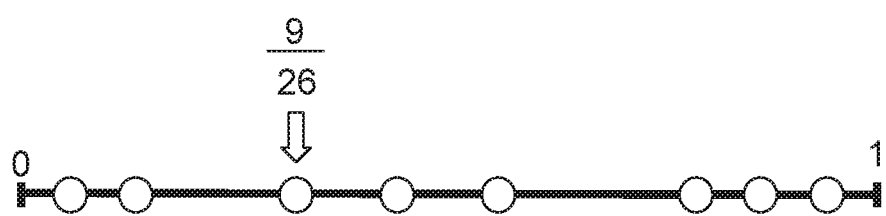
FIG. 1 is a diagram illustrating the concept of unique object estimation.

Numerical labels are provided in some FIGURES solely to assist in identifying components being described in the text; no significance should be attributed to the numbering unless explicitly stated otherwise.

DETAILED DESCRIPTION

The following description sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, and for all purposes. The term "e.g." used throughout is used as an abbreviation for the non-limiting phrase "for example."

The teachings hereof may be realized in a variety of systems, methods, apparatus, and non-transitory computer-readable media. It should also be noted that the allocation of functions to particular machines is not limiting, as the functions recited herein may be combined or split amongst different hosts in a variety of ways.

Any reference to advantages or benefits refer to potential advantages and benefits that may be obtained through practice of the teachings hereof. It is not necessary to obtain such advantages and benefits in order to practice the teachings hereof.

Basic familiarity with well-known web page, streaming, and networking technologies and terms, such as HTML, URL, XML, AJAX, CSS, GraphQL, HTTP versions 1.1 and 2, HTTP over QUIC, MQTT, TCP/IP, and UDP, is assumed. Likewise, basic familiarity with well-known database technologies and terms, such as relational databases (RDBMS), SQL databases and queries, NoSQL databases and/or key-value approaches, is assumed.

All references to HTTP should be interpreted to include an embodiment using encryption (HTTP/S), such as when TLS secured connections are established. The terms "client" and "client device" are used herein to refer to hardware in combination with software (e.g., a browser or player application). While context may indicate the hardware or the software exclusively, should such distinction be appropriate, the teachings hereof can be implemented in any combination of hardware and software. Hardware may be actual or virtualized.

Terminology

The following terms are used in the detailed description that follows.

The term "fingerprint" means data that enables estimation of the total number of unique objects observed during some period of time, typically by one or more cache servers.

The term "fingerprint key" means the items that are collected in the fingerprint.

The "origin" means the origin infrastructure, e.g., one or more servers, associated with a content provider, that are accessed to resolve end-user requests in the case of cache misses.

Overview

The metric of the maximal origin offload can be defined as the maximal offload that can be achieved by an "ideal" CDN, i.e., one that has no restrictions on resources and can store any object indefinitely. This metric can be defined as:

$$\frac{\#total\_num\_of\_requests - \#unique\_origin\_hits}{\#total\_num\_of\_requests}$$

Like a metric of actual observed origin offload, it is a number between 0 and 1, with higher being better. The idea behind the maximal metric definition is that each unique object requires at least one access to the origin (origin "hit"), because that object was not seen before. In the ideal case, however, a single origin access for a single unique object would be enough to be able to thereafter serve all clients with a cached version of the single unique object, during the time period of interest.

Note that an optimal or desired offload—for which a given system is ultimately tuned—may not always be the maximal offload. Optimal offload would be the best offload we want to achieve given other design and resource constraints. For example, sometimes one doesn't want to shoot for the maximum because the cost is too high. But knowing the maximal offload and distance to it is important to know if improvement can be or should be done.

To illustrate how maximal offload can be calculated and used, consider the following examples:

Example 1

Assume that after we observed 1000 requests (to a cache), we got 300 origin hits, that provides an offload ratio of 0.7. In addition let's assume that 10 unique objects were accessed at the origin during that workload, then the maximal offload is: (1000−10)/1000=0.99, which is much better than the achieved one and although 0.7 is not a bad offload it's clear that there is still a potential for improvement.

Example 2

Assume that in observing 1000 requests, we observed 700 origin hits, which provides a relatively poor offload ratio of 0.3. But now assume that there were 650 unique objects—then the maximal offload is: (1000−650)/1000=0.35. The maximal offload shows that no matter how many computer resources are spent, the offload ratio cannot be made to be much better than 0.3, as the situation is bounded at 0.35.

The exact number of unique objects is not known ahead of time, periodically changes, and requires a lot of resources to be calculated exactly (e.g., by tracking and comparing all objects). However, the teachings hereof provide a way to estimate it by using a distributed, low memory footprint system that is described in the next section.

A topic related to the origin offloading is capacity planning, as changing the amount of allocated resources can affect the offloading in different ways. It is known to solve that problem by using footprint-descriptors (Sundarrajan et al. "Footprint Descriptors: Theory and Practice of Cache Provisioning in a Global CDN", 2017, In Proceedings of CoNEXT '17, Incheon, Republic of Korea, Dec. 12-15, 2017, 13 pages). The footprint-descriptors are calculated by collecting the store logs from cache servers and running on them a modified stack-distance algorithm for LRU cache simulation. Footprint-descriptors are used to present the relations between the capacity, eviction age and offloading ratios. Knowing these relations allows more accurate resource planning and predictable offloading results. As part of this document we will present fingerprint based footprint-descriptors (FD) instead of log based, which provides many improvements.

Each fingerprint represents an estimation of unique objects per some period of time. By merging multiple fingerprints the estimation of unique objects per merged period will be observed. For example each fingerprint can estimate the unique accesses to the origin during a time period. Assume that on day 1 there was 1 million unique objects and at day 2 was 1 million unique objects (based on the fingerprints of this two days in separately), and the union of the two days provides 1.5 million unique objects, then it's clear that 0.5 million objects from second day already were observed on the first day, and that the other 0.5 million are a truly new objects that were not observed before (if we are looking just one day back). So there was some reason why this 0.5 million objects that were already in the cache on day 1 were not served from cache on day 2, and if we assume that the reason was storage capacity then we can claim that adding more capacity will prevent such behaviour, and the required amount can be upper bounded by amount of unique objects from configured time period at our example and multiplied by average object size (that can be estimated by average size of sampled objects at fingerprint).

Usage of fingerprints will also allow us to understand if the storage capacity is the problem or in opposite the amount of objects was a problem but not the capacity, if for example the amount of unique objects is higher than the object limit, the objects will be evicted regardless of available capacity.

In sum, the teachings hereof have multiple applications including capacity planning, escalation (since knowing the maximal potential offloading will help to understand if the problem is indeed a CDN configuration or a content provider configuration), run-time monitoring (discover content providers and cache server clusters that have a big gap between the current and potential offloading) and development (monitor the effect of new offloading improvement-oriented features).

High Level Design

Cached objects in a CDN are typically identified by a cache key, a unique identifier that allows the CDN to recognize that the same object is stored in the cache and hence the client request can be resolved internally, without the need to access the origin or another server. For example, a cache key can be a storetable key that is calculated by a hash function applied to the URL and/or other object metadata. There are many ways to construct a cache key and the teachings hereof do not depend on the use of any particular approach.

According to this disclosure, the cache keys are used as a basis to calculate the fingerprint keys that will be used for the fingerprint calculations. The fingerprint key can be calculated by applying an any pseudorandom function such as an MD5 hash or SipHash on the storetable key, after some bit manipulation (if required) that will be described later, and an object size that will be concatenated to the storetable key. The object size can be included to distinguish between different objects that were returned by the same URL, but this is just one option. A variety of alternatives are possible, for example, instead of object size, the hashed storetable key can be concatenated with the eTag of the object, or a CRC32 code calculated over some or all of object, or any other error detection/correction code, or even some part of the content itself.

The pseudo random nature of the function used to produce the fingerprint key assumes that the outcome is uniformly distributed on all the output domain (the function's range).

$$FingerprintKey=MD5(CacheKeyBitManipulation(CacheKey) \circ ObjectSize)$$

For simplicity one can map the input domain to [0,1] range, meaning that each object cached in the CDN identified by a cache key can be mapped to a point between 0 and 1, and the mapping will be uniform.

In this way we transform the problem of estimating the number of unique objects to the problem of estimating the number of unique points chosen from 0 to 1. In this terminology, "choosing" a point means the cache server, or the CDN, experiencing a cache miss, which requires a forward request to an origin (or other upstream server) for a requested object. As noted, the pseudo random flavour of the hash function makes the points uniformly randomly distributed on that 0 to 1 range. Each point can be chosen multiple times, but should be counted only once during the calculation of the amount of unique points.

Mathematically, the solution for counting the number of unique objects can be considered an adaptation of an approach presented in Ziv Bar-Yossef et al., "Counting distinct elements in a data stream", International Conference on Randomization and Computation (RANDOM) 2002. The solution is based on the following observation: the expectation of the minimum of N uniformly randomly chosen points from the range [0,1] is $1/(N+1)$, so by storing only the minimal value out of all the chosen points, we are able to calculate an expectation of the number of points that were uniformly drawn. The weakness of such a solution is its high variance. To reduce the variance we can track the value of the point at position K instead of at the minimum, and in this case the expectation is $K/(N+1)$, and it is much more stable. The variance will be much lower compared to the usage of minimum (as proven by Bar-Yossef et al.). The position K is referred to as a K-th value. For example if K=5, then the 5th smallest value would be the important value to track, requiring keeping track of 5 values of course, as new data points are chosen (i.e., as new requests for more objects cause cache misses). Note that while using the K-th smallest value is a preferred approach, one can alternatively maintain the top K largest values (i.e., the K-th largest value). The expectation is then $1-K/(N+1)$, which as before can be solved for N to produce the estimate. Moreover, the approach can be generalized to any set of K points within a range. In other words, given a range between two numbers (A,B) with a uniformly spaced set of points distributed between them, one can decide to track any set of K sequential points within the range. The expectation of the length of this interval will be $K/(N+1)$. So, by knowing the A and B values then N can be calculated. The con of such a general solution is that it will complicate the merging of fingerprints.

It should be noted, again, that this approach produces an estimate and not an exact count of the number of unique points, and thus an estimate of the number of unique objects.

In some cases, it may be necessary to manipulate the cache key, which was indicated in the formula above as 'CacheKeyBitManipulation'. This will depend on the cache key construction and particular cache and CDN design. For example, a CDN can offer edge services in which an original object, fetched from origin, is modified in the CDN (e.g., personalized, transcoded, operated on by a processing environment, or otherwise). All such cached representations can be based on the same unique original object. So one bit manipulation may be masking bits in a cache key that are used to designate the transformed object. Also, if a CDN uses different cache key algorithms in different machines or networks that actually refer to the same unique object, the cache key bits can be manipulated so that all such representations point to the same point in the interval [0, 1].

A numerical example of the unique object estimation algorithm is now provided, with reference to FIG. 1. For example for N=8, and K=3 let assume that the value of the point at position K is 9/26. Thus we have an estimate of unique points of:

$$\frac{K}{N+1} = \frac{9}{26}$$

$$N = \frac{26K}{9} - 1 = \frac{78}{9} - 1 = 7.66.$$

As a result, by maintaining only K minimal points the amount of unique objects (which can be much higher than K) can be estimated with high confidence. Confidence is a function of K; the higher K the higher confidence will be. The set of K points is referred to herein as a "fingerprint" of the group of unique objects. In general, K=1000 has proved to result in an average error rate of less than about 5%. By increasing to K=10,000 the error rate has resulted in error rates under 1%, with the obvious tradeoff of using more memory to track the K points. These figures, of course, vary depending on the domain(s) that are sampled, i.e., the nature of that traffic, and of course it varies over time to some extent. Implementations will vary according to resources available and design requirements.

The benefit of such an approach is that it requires a low memory footprint, and can be easily distributed and parallelized. Other methods can alternatively be used to calculate an estimate of the number of unique objects. For example, the HyperLogLog algorithm, which is known in the art, can be used to estimate the number of unique elements in a set. HyperLogLog techniques also include merge operations which can be used with the teachings hereof.

Each cache server can maintain its own fingerprints independently based on cache misses that it is experiencing. Fingerprints from multiple servers can be merged to obtain the fingerprint and thus the unique object estimate for a cluster or for the entire network. The cache servers can calculate the fingerprint for each hostname or set of hostnames associated with each content provider over a configured time interval. For example, the fingerprints can be calculated over a 24 hour period.

By merging the fingerprints in different ways (described later) we can calculate the maximal origin offload across all the network, per cluster or set of clusters, a single cache server, and estimate how increasing or decreasing of eviction age can affect the offload ratio, e.g., to find the amount of resources that should be spent to achieve target offload, e.g. 95% of the maximum. By using the fingerprint based descriptors one can calculate the capacity required to achieve the desired eviction age, and the required offloading ratio.

Design Details

In one embodiment, each cache server maintains a list of fingerprints, one per content provider (and/or, per set of one or more hostnames). Each fingerprint contains the K smallest points observed in predefined time intervals (e.g., 24 hours). Each point represents the cacheable request that was resolved by issuing a forward request for the object (e.g., to access the origin) after a cache miss. Preferably, a fingerprint contains 1000 items (K=1000) for accuracy, although this is a design choice and can vary. The cache server can collect data for all content providers, but in a preferred embodiment collects data only for the content providers with the most traffic (e.g., the top 500). In some embodiments, the size of K could be configured to be adaptive to the offloading ratio.

Figure 2:
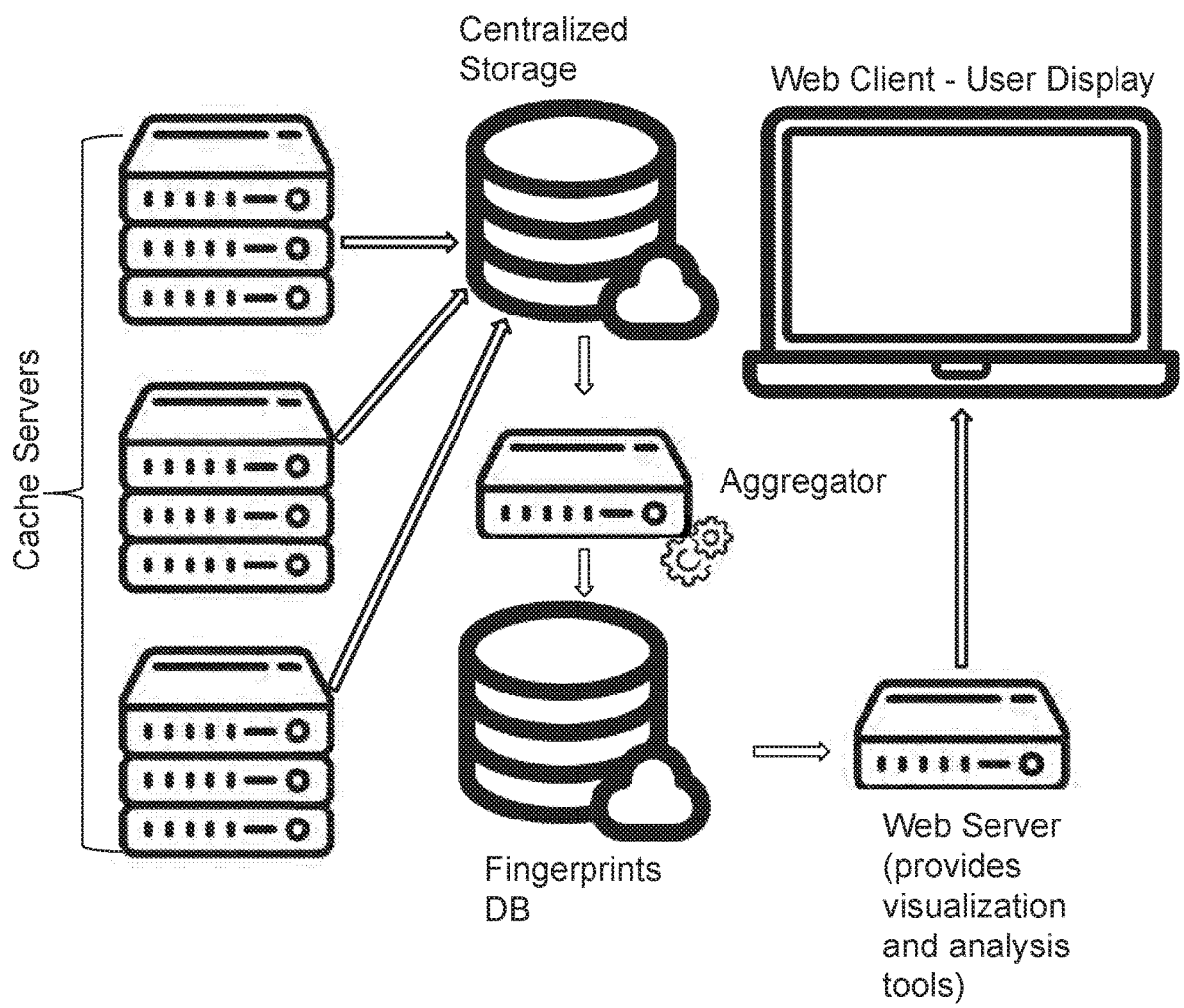
FIG. 2 is a diagram illustrating one embodiment of a system in accord in with the teachings hereof.

The collection of this data enables answering network end-to-end offloading related questions. However, if one desires to look at cluster based granularity preferably there is a separate fingerprint for accessing a cache parent. That is, the origin and parent based fingerprints can be maintained separately since, for example, having 1 million unique objects while only 10% of them are from origin is totally different from having 1 million objects with 90% of them coming from origin. Collected fingerprints can be sent to a centralized storage, a periodic (e.g., daily) background process can aggregate the fingerprints and insert the current and maximal offloading ratios (per content provider) to the centralized database. FIG. 2 provides a schematic view of the system.

The aggregation can be done for groups of cache servers by merging the individual server level fingerprints. Likewise the whole network fingerprint can be found by merging fingerprints for all the regions.

In addition, each cache server can maintain a variety of counters, for example the total number of requests served, number of cacheable requests, number of requests that were resolved by origin access for cacheable traffic. The counters can be maintained per hostname and then per content provider (a set of one or more hostnames) over a 24 hour period. (Additional metrics are provided later in the document at Additional Metrics.) Based on the metrics the current origin offload ratio, and number of total requests can be calculated per content provider by content provider basis.

Fingerprints can be merged for the last month per cache server, per cluster and per network, and total requests number will be accumulated for the same time interval and from that number the maximal offloading can be calculated.

As shown in FIG. 2, the entire system can be divided into three parts: the cache server implementation, the subsystem that transfers and aggregates the data to a centralized database, and the subsystem that accumulates and presents the results (e.g, via a web server).

Cache Server Implementation

This section describes one implementation of a data structure that holds the data for a single content provider. In one embodiment, the data structure that represents the fingerprint maintains K minimal hash values calculated by applying the pseudo random hash function to the cache keys of the requested objects that cause a cache miss. As noted above, separate count can be maintained for cache misses that are resolved to a parent and those that are resolved to the origin. The hashes of the cache keys can be mapped to the interval [0,1] by dividing them by the maximal value for that hash function ($2^T-1$ for a hash function that uses T bits).

Here we will describe in pseudocode the simple algorithm that will allow us to maintain such K items in a consistent way.

```
while (request=get_next_request( )) not None:
    x=hash(request)
    if len(fingerprint)<K:
        if x not in fingerprint:
            fingerprint.add(x)
    else:
        if x>fingerprint.max( ):
            continue
        elif x not in fingerprint:
            fingerprint.add(x)
            fingerprint.drop_max( )
```

The pseudo code above describes the following process:
1. Get next request
2. Calculate the hash function on the next request, the hash will be noted by X
3. If the number of stored objects is less than K check that X is not already stored at the data structure—if not add it to the data structure
4. Else compare X to the maximal value at the data structure
   a. If X is bigger than the maximal value, continue to the next request
   b. Else check that X is not already stored at the data structure—if not add it to the data structure—and drop the current maximal value—to maintain the invariant the there are no more then K objects in data structure As it can be seen from the algorithm the data structure should efficiently support finding of maximal objects and evaluation if some object is not already part of the data set. There are multiple data structures that supports such properties:
1. Updating the current max can be done once for each insertion (after max_drop if it was done)—and can require O(K) steps for flat data structures and O(log (K)) for search trees and heaps.
2. The lookup can be done by O(1) by using unordered_set (or any other hash based solution), O(log (K)) for search trees and O(K) steps for flat data structures.

After insertion of the new fingerprint key the current max will be updated, so the time of insertion will be dominated by the current max calculation. The above is only one example implementation: other possibilities include a heap based on an array of size K, which uses a minimal amount of space, but requires O(K) steps to validate that an object does not already exist, which can be very expensive if some very frequent request got a very low hash value; or a heap based on an array of size K, and usorted_set for fast verification if item exists or no; or a set or balanced search tree.

A producer-consumer model can be used. The heap.max will be an atomic field so accessing it would not require a lock. And one can add new items to the temporary buffer, implemented as a stack based on a linked list, as follows:

```
Init:
K = 1000
class Node:
    def _init_(pair):
        value = pair
        next = null
class Stack:
    head = null
    def push(pair):
        newHead = new Node(pair)
        while (true)
            tmpHead = head
            newHead.next = tmpHead
            If atomic compare head = tmpHead exchange head, newHead
                return
    Def pop( ):
        oldHead = Exchange head, null
        return oldHead
Struct pair:
    int current_key
    int obj_capacity
buffer = Stack( )
heap = Heap( )
hash_table = HashTable<int,int>( )
def update(current_key, obj_capacity):
    if current_key in hash_table
        return
    if heap.size( ) > 0 and heap.max <= current_key
        return
    if heap.size( ) == K
        del Hash_table[Heap.max]
    hash.add(current_key)
    hash_table[current_key] = obj_capacity
Execution:
if heap.max > current_key
    try_lock write_lock:
        on success:
            update (current_key, obj_capacity)
            tmp_buffer = buffer.pop( )
            while tmp_buffer != null
                update(tmp_buffer.value.current_key,
                    tmp_buffer.value.obj_capacity)
```

```
    tmp_buffer = tmp_buffer.next
on failure:
    buffer.push(pair(current_key,obj_capacity))
```

In this implementation, the objects are added to the temp buffer only if they are smaller than heap.max and are not already part of the heap. The hash table will be used to make such checks efficiently. The temp buffer can be implemented lock free to avoid lock contention. To avoid memory explosion, all the tmp lists of all the monitored cp_codes can have an upper limit such that by reaching it the new request would not be added to the tmp buffer—they will be dropped—and the drop counter will be updated to allow monitoring on such events.

Figure 3:
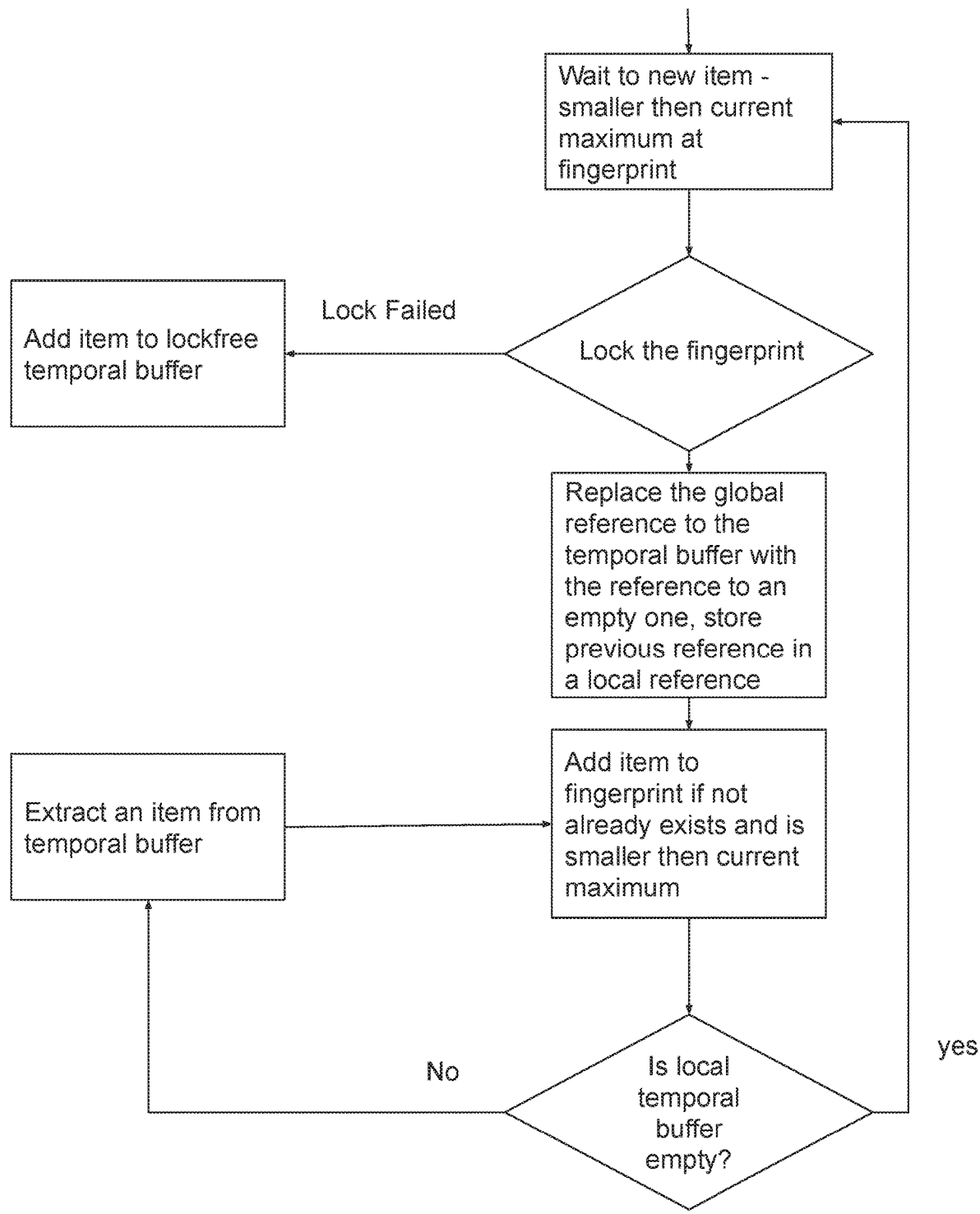
FIG. 3 is a flow diagram illustrating one embodiment of a data collection for a fingerprint.

FIG. 3 provides a flow diagram outlining the process.

Preferably, to align the fingerprints across different cache servers all the collection periods can start at the same time UTC 24:00, and after each sampling period will be closed the fingerprints can be written down to the disk, to be sent later.

To distribute the load on the centralized repository that will receive all the collected data from all the servers, each server can have a designated time slot to send the data. The time slot can be given by the hash on the machine IP address modulo number of slots that will be defined in a configuration file. The time slot is set after the file is written to disk. After sending the data and getting the ACK the local file is removed.

Each cache server can maintain the starting time of the collection period, since in the case of failure the starting time will be different from 24:00 UTC, and sampling period will be less than 24 hours, the length of the period will be sent together with the fingerprint.

When the cache server starts it checks if there exists the yesterday's file with fingerprints, if the file exists then cache server chooses the new time slot to send it by calculating the machine's IP address modulo T (while T will be the number of remained sending intervals till end of the day)+the current time slot (the current interval). Preferably the fingerprints are sent sorted.

An optional optimization that can be done for the sample collection process is to add to it the persistent state that is written to a disk periodically, e.g. each 10 minutes. Last n versions can be stored on the disk in case the last file was corrupted for any reason. Adding such a persistent state will require to load it back during cache server start.

Data Structure for Multiple Content Providers

To allow multiple cache servers to update the state of each fingerprint in parallel for multiple Content Provider (CP) identifiers, there can be a lock free data structure that will hold mapping from content provider identifier to its data structure (defined at previous paragraph). The data structure can be implemented by a hash table that can include, for example the top 500 content providers. The weight can be defined by following metric:

max(cp_code_object_counter/total_object_counter,
    cp_code_used_capacity/total_used_capacity)

The data structure can be updated on a daily basis, e.g., during the start of a new period of fingerprint collection.

Unique Objects

The methodology presented herein provides an accurate estimate of unique objects, but the question remains: which objects are interesting from the business perspective? One of the main goals is to find the potential places for improving offload. There are a few corner cases that bear mention:

Miss inflation—when a client requests only sections of a whole object, which will cause high hit offloading but low bit offloading.

Prefetching—a cache server may issue a prefetch request, as known in the art, which does not correspond to any client request. This is an internally generated request that may fetch some real requests to the origin and fetch some real bytes into the cache, but it counts for 0 bytes and 0 requests in terms of served traffic.

Low time to live (TTL)—here, the cache server is sending an IMS (if modified since) request to the origin to validate that it can serve the object from cache. If the response has HTTP error code 304, it means that we indeed can serve the cache from the CDN's copy; if the response is 200 it means that new copy was returned from origin.

PoC (Partial Object Cache)—some large objects can be chunked into multiple small-partial objects, while each one of them will require a separate origin request—this will cause "negative" offloading.

In general, the goal is to improve the offloading and focus on the potential improvement and allow us to estimate the impact that we can cause to the offloading by changing the system.

It means that even if we get negative offloading, the more important question is how far it is from the maximal one. Using this philosophy, one might exclude the requests that were caused by the IMS (if-modified-since) requests from the unique object determination, since it depends more on the content provider configuration than on CDN resource allocation and/or design. However, if TTL optimization is of concern, then IMS requests might be included, in some situations.

Requests caused by PoC, miss inflation and prefetching can be maintained as regular end user requests and will be inserted to the same data-structures. This is because each such object represents that the origin actually was accessed by the cache server, based on the internal decisions. Of course there is a chance that some prefetched data was never accessed by the end user client, but that is not a problem of caching but rather a problem related to the prefetch algorithm, which should be monitored and addressed as part of prefetch design tuning.

Note: Although the IMS requests may not be included in the fingerprints they are still important to understand the end-to-end offloading observed by the content provider, i.e., to be able to recognise when the offloading problems are caused by poor content provider configuration. In addition to the total number of requests, the system can count the number of IMS requests that were finished with HTTP error code 200 (the access to the origin was necessary) and with HTTP error code 304 (the end-user client request is served from cache server's local cache. Low offload ratio together with a high count of HTTP 200 cases can happen when the data is not suitable to be cached. Low offload ratio together with high count of HTTP 304 responses can indicate that the configured TTL for the object is too low, and perhaps should be increased.

The requests will be sampled after the response is received from the origin, and after the decision to mark it as public or private.

Metrics

The following table provides an example of metrics that can be collected by a cache server.

| Field name | Description | Refresh policy |
| --- | --- | --- |
| origin_fingerprint | Vector with K minimal fingerprint keys calculated out of the object cache keys (store object IDs) fetched from origin | Reset every reporting period (24 H) |
| parent_fingerprint | Vector with K minimal fingerprint keys calculated out of the object cache keys (store object IDs) fetched from parent | Reset every reporting period (24 H) |
| served_user_requests_total_count | Total amount of served requests - for all objects both cacheable and non-cacheable | Reset every reporting period (24 H) |
| served_user_requests_total_capacity | Total capacity of the served objects for all (cacheable and non-cacheable) the requests in bytes | Reset every reporting period (24 H) |
| cacheable_user_requests_total_count | Total amount of served requests for cacheable objects | Reset every reporting period (24 H) |
| cacheable_user_requests_total_capacity | Total capacity of the cacheable served objects for all the requests in bytes | Reset every reporting period (24 H) |
| number_of_stored_objects | Number of stored objects at the store table | Refreshed from cache server store table cache at report period intervals |
| used_capacity | Capacity of the stored objects | Refreshed from ghost store table cache at report period intervals |
| origin_requests_total_count | Total number of origin requests | Reset every reporting period (24 H) |
| origin_requests_total_capacity | Total capacity of origin requests in bytes | Reset every reporting period (24 H) |
| origin_requests_sum_sqr_size | Sum of the squares of the sizes off all the origin requests, in bytes^2 | Reset every reporting period (24 H) |
| parent_requests_total_count | Total number of parent cache requests | Reset every reporting period (24 H) |
| parent_requests_total_capacity | Total capacity of parent cache requests, in bytes | Reset every reporting period (24 H) |
| parent_requests_sum_sqr_size | Sum of the squares of the sizes off all the parent cache requests, in bytes^2 | Reset every reporting period (24 H) |
| origin_ims_200_count | Total number of HTTP 200 responses for IMS requests from origin | Reset every reporting period (24 H) |
| origin_ims_200_capacity | Total capacity of HTTP 200 responses for IMS requests, in bytes from origin | Reset every reporting period (24 H) |
| origin_ims_304_count | Total number of HTTP 304 responses for IMS requests from origin | Reset every reporting period (24 H) |
| parent_ims_200_count | Total number of HTTP 200 responses for IMS requests from parent cache | Reset every reporting period (24 H) |
| parent_ims_200_capacity | Total capacity of HTTP 200 responses for IMS requests, in bytes from parent cache | Reset every reporting period (24 H) |
| parent_ims_304_count | Total number of HTTP 304 responses for IMS requests from parent cache | Reset every reporting period (24 H) |
| origin_fingerprint_number_of_objects | Number of objects at origin fingerprint | Reset every reporting period (24 H) |
| origin_fingerprint_total_capacity | Total capacity of the objects at origin fingerprint | Reset every reporting period (24 H) |
| origin_fingerprint_sum_sqr_requests_size | The sum of squares of the sizes of the objects from the origin fingerprint | Reset every reporting period (24 H) |
| parent_fingerprint_number_of_objects | Number of objects at parent fingerprint | Reset every reporting period (24 H) |
| parent_fingerprint_total_capacity | Total capacity of the objects at parent cache fingerprint | Reset every reporting period (24 H) |
| parent_fingerprint_sum_sqr_requests_size | The sum of squares of the sizes of the objects from the parent cache fingerprint | Reset every reporting period (24 H) |

| Field name | Description | Refresh policy |
| --- | --- | --- |
| origin_hash_collisions_count | The number of hash collisions in origin fingerprint -- identified by getting same hash value with different object size | Reset every reporting period (24 H) |
| parent_hash_collisions_count | The number of hash collisions in parent fingerprint - identified by getting same hash value with different object size | Reset every reporting period (24 H) |

For a cache server, each report can contain:

| Field name | Description | Refresh policy |
| --- | --- | --- |
| cache-server_object_limit | cache-server object limit counter | Sampled from cache-server once at 24 H |
| ghost_number_of_stored_objects | Current number of the stored objects at cache-server | Sampled from cache-server once at 24 H |
| cache-server_disk_total_capacity | cache-server Total disk capacity, MB | Sampled from cache-server once at 24 H |
| cache-server_disk_used_capacity | Utilized disk capacity at cache-server, MB | Sampled from cache-server once at 24 H |

Data Reporting

The above data can be sent using protobufs, a known data format, or any other suitable mechanism. A prefix with length of the buffer (32 bit integer) can be added to the buffer after the serialization to allow multi-buffer concatenation.

Cache Server Offload Fingerprint Engine

In order to fill the data structures that will be transmitted to the centralized storage (FIG. 3), an offload fingerprint engine component can be added to the cache server and it can collect the data at various points during standard HTTP request processing for an object identified by a URL. This component can be invoked and then collect the necessary data at the time of a new request for a cacheable object from a client, and also at the time of a new forward request to an origin or parent for the requested cacheable object (i.e., a cache miss).

Merge Operations and Insights

The fingerprint of a set of object requests (a trace) is the set of the smallest K points (hashed cache keys) in that trace. Given fingerprints of two or more traces, it is possible to find the set of K smallest points among all the fingerprints, e.g., by simply aggregating the points and sorting them. If the traces themselves were merged and the K smallest points were found from the merged trace, they would be the same points found above by merging the fingerprints of the traces. Thus, fingerprints have the important property that merging the fingerprints of two traces gives the fingerprint of the merged traces. The value of the K-th point in the merged fingerprint gives an estimation of the count of the unique cache keys (and thus objects) in the combined trace. This has a variety of applications which can be performed by analysis and visualization tools based on the collected fingerprint data. Here are some ways in which fingerprints can be merged:

First, the system can combine the fingerprints generated by two (or more) separate cache servers in the same time interval T. The individual fingerprints give an idea of the unique content being requested at each cache server, while the merged fingerprint gives an idea of the unique content across the caches, the content that is common to both, and a content replication factor. Note that the maximal offload achievable by the combined caches can be obtained by looking at the merged fingerprint and the total number of requests for objects (cacheable objects), using the formula presented earlier:

$$\frac{\#total\_num\_of\_requests - \#unique\_origin\_hits}{\#total\_num\_of\_requests}$$

In a variant of the above, the system can generate fingerprints for each content provider (e.g., by domains) whose content is stored in the cache. This allows the metrics to be calculated on a per-content provider basis. Since the nature of the content provider's content may differ significantly, this can be used to tune the cache space and eviction algorithm for each content provider to provide the best overall performance.

Second, the system can combine the fingerprints generated by the same cache server for successive time intervals of length T. Suppose f1 is the fingerprint for a trace for the period [0–T), and f2 is the fingerprint for the trace for the period [T–2T). Fingerprint f1 gives the estimated unique object count in the first period, f2 gives the estimated unique object count in the second period, and the merged fingerprint gives the estimated unique object count in the period [0–2T). Thus given a sequence of fingerprints of short-duration traces, one can estimate the unique content seen over a longer duration. Also, given this sequence, one can estimate the rate at which new objects are being discovered in each period of length T, those that were not seen before in the trace.

A variant of this second approach, fingerprints for related time periods can be merged. Such time periods may not be consecutive. For example, suppose that the fingerprints for all working days are merged and separately all fingerprints from weekend days are merged to understand commonality across those days. Then the working day fingerprint can be merged with the weekend days fingerprint to determine if there is less overlap of objects (relative to the working days amongst themselves and/or the weekend days among themselves). If it is found that working days share objects while the weekend days do not, then the cache storage can be adjusted to take advantage of this insight. At the end of the working week, the objects in the "working day" group could be removed from the hot object cache and the local disk cache and be placed in a relatively low cost (but slower) storage (e.g., per server cluster). When the first working day arrives, this group of objects can be retrieved again. Meanwhile, the weekend day group of the objects can likewise be removed at the start of the working week, and restored when the weekend begins again. This technique can be extended to compare certain days (e.g., compare each Friday to see if there is an object overlap), or certain dates, holidays, sporting event times. It can also be applied on a daily cycle, i.e., compare fingerprints across several days for the same hour, e.g. 7:00 am to 8:00 am, 8:00 am to 9:00 am, etc.

Data Visualization & Analysis Tools

The fingerprint itself enables an estimate of the number of unique objects requests during a given time period. But, one can also determine how to adjust object eviction age, or potential offloading or capacity adjustments, with additional analysis. The term 'eviction age' here refers to the age at which an object in cache is evicted. The well-known least recently used (LRU) eviction algorithm evicts the object that is the "oldest" in the sense of the longest time since it was last requested (although many modifications to this approach may be made). The eviction age is related to the capacity of the cache (i.e. cache space): as the capacity of the cache is increased, more objects can be stored, and thus older objects can be kept.

A basic example: assume the system collects fingerprint A and fingerprint B from two sequential days, and without loss of generality each fingerprint encodes 1 million unique object requests based on storing the 1000th smallest points (K=1000). By merging them into a new fingerprint C (that will contain 1000th smallest objects from union of A and B) we will get an estimate of the amount of unique requests for the new time interval that contains both days.

Figure 4A:
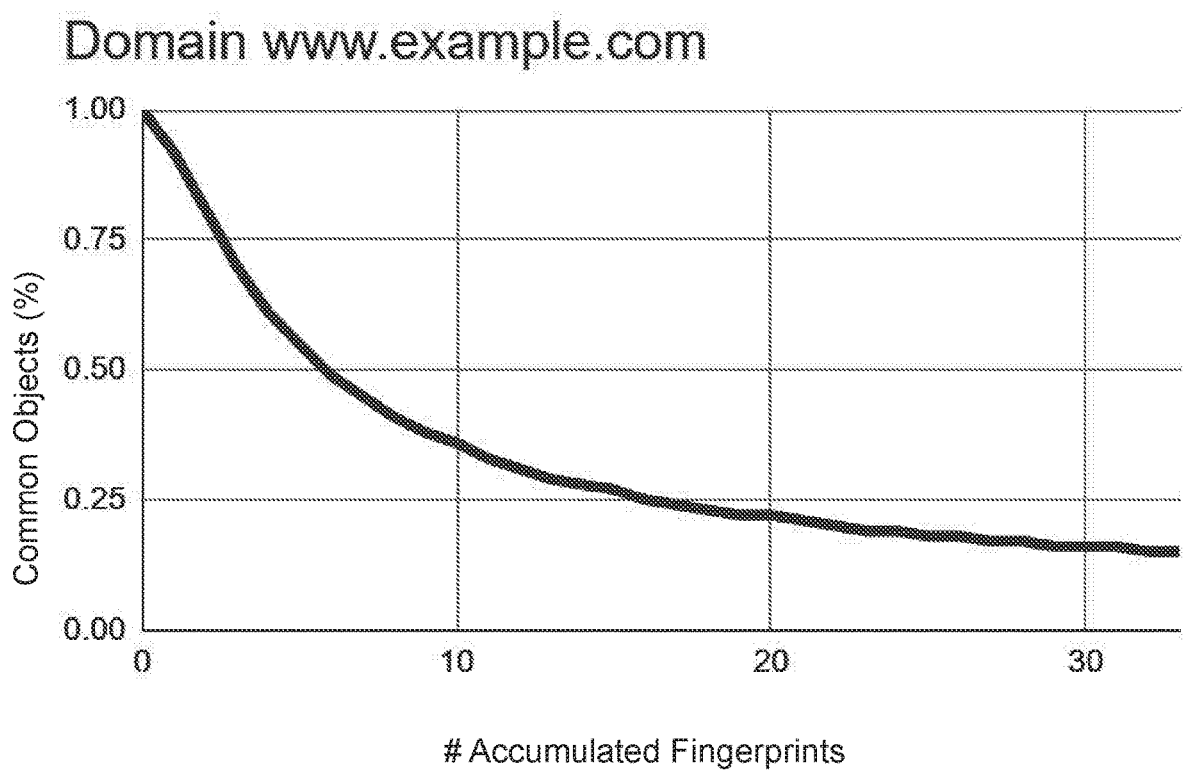
FIG. 4A is an example of a graph of common content across merged fingerprints to understand the contribution of each additional fingerprint that is accumulated into the merget.

Let's assume without loss of generality that based on fingerprint C we get an estimation of 1.5 million unique objects. This means that the second day has an intersection of 500,000 objects with the first day, and if our eviction age were long enough to cover both days (e.g., by adjusting the cache space or any other technique that increases the eviction age) the cache would gain a saving of 500,000 accesses to origin. On the other hand, if the eviction age is too low, such that the objects on the first day are evicted before the second day, then one would expect to see we will expect to need to fetch those 500,000 objects on the second day. This observation can be generalized in two ways:

1. First, one can calculate the additional contribution of the last day with X previous days, where X is iterated through (for example) 0 and 29. This allows to find an optimal length of time where storing the shortest history gives maximal gain. The benefit of such an approach is that it rapidly responds to the changes since it looks on the last day compared to all previous, and any change at the last day behaviour will be immediately recognized. More detail on this is provided in the section below entitled Fingerprint Stack Algorithm. FIG. 4A illustrates how this data can be used in practice. FIG. 4A illustrates, for a given domain(s), the commonality (100 to 0 percent) across fingerprints. The x-axis how many consecutive days of fingerprints have been merged. Hence, FIG. 4A begins at 100 percent, but as additional days are added, the common set of content begins to drop. This graph gives some idea of when adding extra cache space to capture extra days does not provide as much benefit. Of course, while FIG. 4A is depicted in terms of days, any time period could be used (hours, weeks, etc.)

2. Second, one can aggregate the fingerprints by using rolling windows of different sizes. This means that the system is calculating an average for the contribution of any day based on the historical window of X days (X from 0 to 29) and this way the results become more stable. If a single day had some anomaly it would be smoothed by the average. However it does take time to propagate the change at the offloading to be visible. Such an approach is feasible for capacity planning.

Figure 4B:
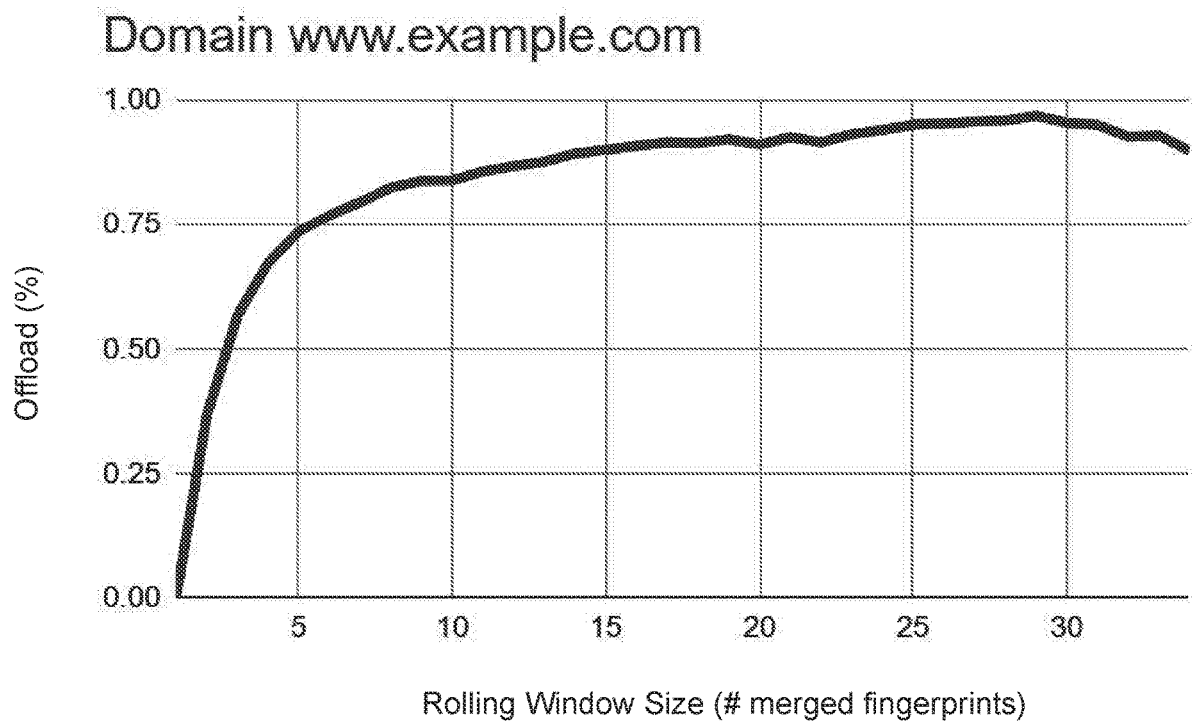
FIG. 4B is an example of a graph of offload based on rolling windows of various sizes.
Figure 4C:
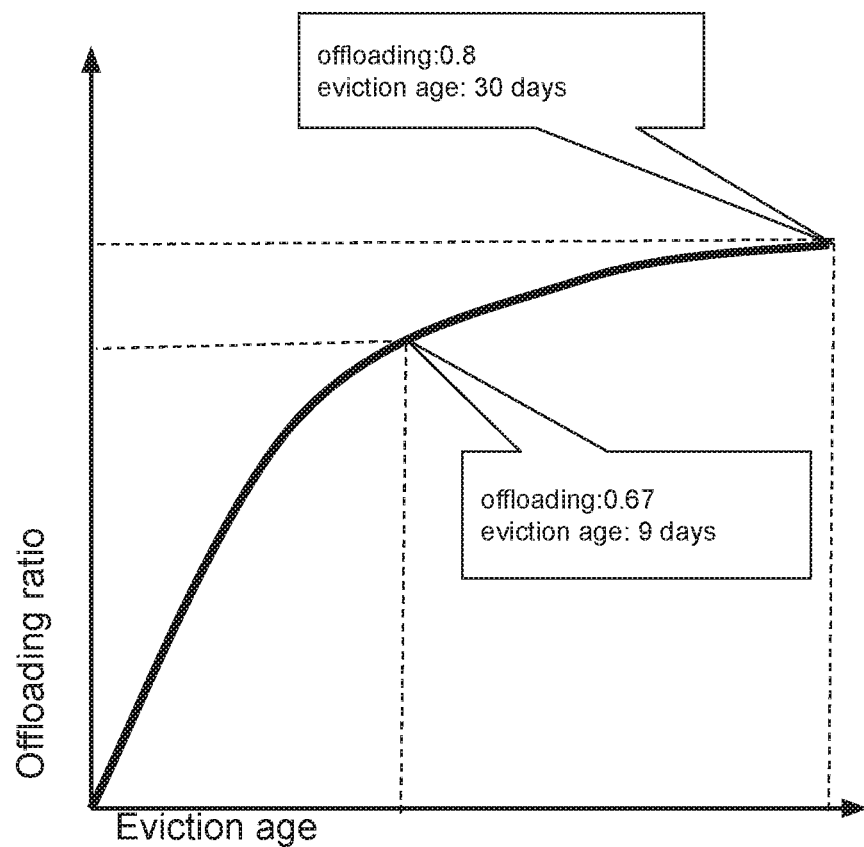
FIG. 4C is an example of a visualization of data that can be provided in connection with offload measurements, in accord with the teachings hereof.

The rolling window approach can be better understood with reference to FIGS. 4B to 4C. The x-axis of FIG. 4B shows the rolling window size, in days (although could be any time period), while the y-axis shows offload for the given domain (or set of domains). So, for example, to create the data point at x=5, one merges the fingerprints for five consecutive days for the domain(s) of interest, and one slides this window one day at a time, over a larger period of time (e.g., 30 days). For each position of the window (days 1-5, days 2-6, etc.), the offload is calculated. This produces 25 samples, which are averaged, which produces the average offload for a five-day window. As shown in FIG. 4B, this process is repeated for sizes of sliding windows ranging from 1 to 30 to produce the curve. FIG. 4B is useful to show how the improvement that results from increasing the cache eviction age of objects one day at a time. (Again, the time period could be hours, or weeks, or any desired length of time instead of days.) As can be seen, after a certain point (about 10 days in FIG. 4B), there is a diminishing returns from increasing the cache size, at least in this example. FIG. 4C is a generalized version of the graph shown in FIG. 4B; this shows how one can analyze the curve to select a desirable time window and understand the offload that will be achieved. Then the cache can be tuned to this size for this domain's traffic.

Both approaches can be extended to analyze and visualize the relation of offloading ratios to the capacity, and not only to eviction age. This can be done by determining the average sizes of all the objects from the fingerprint. This method is mathematically significant, as it is based on a random sample of the whole population but its accuracy depends on the variance of request sizes. To make the capacity planning more robust the variance of the object sizes will be calculated, if the variance will be too high it will mean that the confidence of the calculated average object size based on the fingerprint is low and a warning that notes about it can be added to the report.

User Display—Landing Page

The resulting data will contain the current and maximal offload ratios per hostname and/or content provider. The dashboard can be arranged to focus on mostly important/problematic data. To meet this requirement the landing page can include three tables with 10 entries each one. For example: the first table can include the 10 content providers (or hostnames) with highest potential for improvement, as indicated by having the biggest gaps between the current and the maximal offloading.

The second table can include for example the 10 content providers (or hostnames) with lowest potential offloading ratio.

The third table can present the highest origin impact. For example, improving the offload from 90% to 95% looks less important than improvement from 30% to 50%, but from the origin perspective the case of improvement of offload from 90°/% to 95% reduces 50% traffic from the origin although the 30% to 50% reduces less than 30%.

Example of Table 1

| Content provider id | Total number of request | Number of cacheable requests | Current Total Offload (hits/bits) | Maximal Total Offload (hits/bits) | Current Cacheable Offload (hits/bits) | Maximal Cacheable Offload (hits/bits) |
|---|---|---|---|---|---|---|
| 12345 | 10002431 | 10002431 | 0.37 | 0.79 | 0.37 | 0.79 |
| 12346 | 12235551 | 11002431 | 0.18 | 0.58 | 0.22 | 0.64 |
| 12347 | 97100511 | 37100511 | 0.17 | 0.32 | 0.49 | 0.91 |

Example of Table 2

| Content provider id | Total number of request | Number of request cacheable requests | Current Total Offload (hits/bits) | Maximal Total Offload (hits/bits) | Current Cacheable Offload (hits/bits) | Maximal Offload Cacheable (hits/bits) |
|---|---|---|---|---|---|---|
| 12348 | 23786781 | 17002431 | 0.01 | 0.02 | 0.02 | 0.04 |
| 12349 | 43235551 | 41002431 | 0.02 | 0.05 | 0.02 | 0.06 |
| 12350 | 78978911 | 37100511 | 0.02 | 0.03 | 0.05 | 0.06 |

Example of Table 3

| Content provider id | Total number of request | Number of request cacheable requests | Current Total Offload (hits/bits) | Maximal Total Offload (hits/bits) | Current Cacheable Offload (hits/bits) | Maximal Offload Cacheable (hits/bits) |
|---|---|---|---|---|---|---|
| 12351 | 10002431 | 10002431 | 0.94 | 0.95 | 0.98 | 0.96 |
| 12352 | 23542334 | 23133555 | 0.96 | 0.99 | 0.98 | 0.99 |
| 12353 | 23415515 | 23243113 | 0.90 | 0.92 | 0.95 | 0.94 |

There can also be pages that display the statistics for a given content provider, or by server cluster, or cache server.

The landing page can also include a chart with historical data for the whole network, to understand how the offloading changed over time. The chart can include the current values and the maximal offloading, to see if the gap has decreased over time due to optimizations.

Content Provider Specific Page

This page can include three tables, almost the same tables as a landing page, but here the grouping will be done by server clusters or cache servers and not by content providers.

In addition a fingerprint graph (example in FIG. 4C) that describes the dependence of offloading ratio and eviction age over the network will be presented. The chart will be based on the approaches described above.

The page can also include a chart with historical data for this content provider, to understand how the offloading changed over time. The chart can include the current values and the maximal offloading, to see if the gap has decreased over time due to optimizations.

In addition there can be a list of all cache servers that are serving the given traffic for the content provider, with their current and maximal offloading ratios, number of served requests and other statistics.

Cache Server Cluster Page

This data page will be accessed by the search for a specific cluster of one or more cache servers. It can show things like: ten most active content providers, the content providers with highest amount of requests; ten most potential content providers, the content providers with biggest gap between current and maximal offloading ratios; ten most problematic content providers, the content providers with lowest potential offloading ratio; ten highest origin impact content providers, the content providers with highest potential impact on the origin offloading; ten most active cache server machines, those machines with highest amount of requests; ten most potential cache server machines, those machines with biggest gap between current and maximal offloading ratios; ten most problematic cache server machines, those with lowest potential offloading ratio; ten highest origin impact cache server machines, those machines with highest potential impact on the origin offloading.

Cluster for Content Provider Page

This page will include all the cache server machines that hold the traffic for the given content provider, with their offloading statistics.

Example Table:

| Cache Server IP | Total Number of requests | Number of Cacheable requests | Current Total Offload (hits/bits) | Maximal Total Offload (hits/bits) | Current Cacheable Offload (hits/bits) | Maximal Offload Cacheable (hits/bits) |
|---|---|---|---|---|---|---|
| 192.0.2.0 | 13283 | 11283 | 0.41 | 0.68 | 0.45 | 0.73 |
| 192.0.2.8 | 8679 | 8677 | 0.75 | 0.78 | 0.75 | 0.78 |
| 192.0.2.16 | 7935 | 7931 | 0.67 | 0.69 | 0.67 | 0.69 |

Fingerprint Stack Algorithm

By property of the LRU (least recently used) cache eviction algorithm, if a cache has an eviction age of E seconds, then all the objects requested in the past time interval of length E seconds are guaranteed to be in the cache at the end of that interval. Also, any object that was last requested more than E seconds in the past, then it's guaranteed to not be in cache at the end of that interval. Suppose the cache writes periodic fingerprints for traces of duration T (where T<E). By merging the fingerprints of a period of length E, one gets the fingerprint of content in cache. Let O be the estimated number of objects in cache as seen from this fingerprint. Then, merging the fingerprint of the next time interval T into the fingerprint of content in cache gives an estimate of the new content requested for the first time in this time interval T, which is also the estimate of cache misses in that interval. Thus, one can establish an approximate relationship between E, O, and the cache misses. Those skilled in the art will understand that because the fingerprint provides an estimation of the number of unique objects, the footprint descriptor based on it (or any value based on the fingerprint) also will provide an estimation and not exact result. This relationship is the foundation of footprint descriptors theory.

With the basic relationship between eviction age, cache size and cache miss rate of LRU caches established in the above, we now look to develop an algorithm to create a footprint descriptor from the fingerprints. First we present a stack algorithm, as it bears some similarity to the existing algorithm. However, as will be seen below, it can be further simplified.

Figure 5:
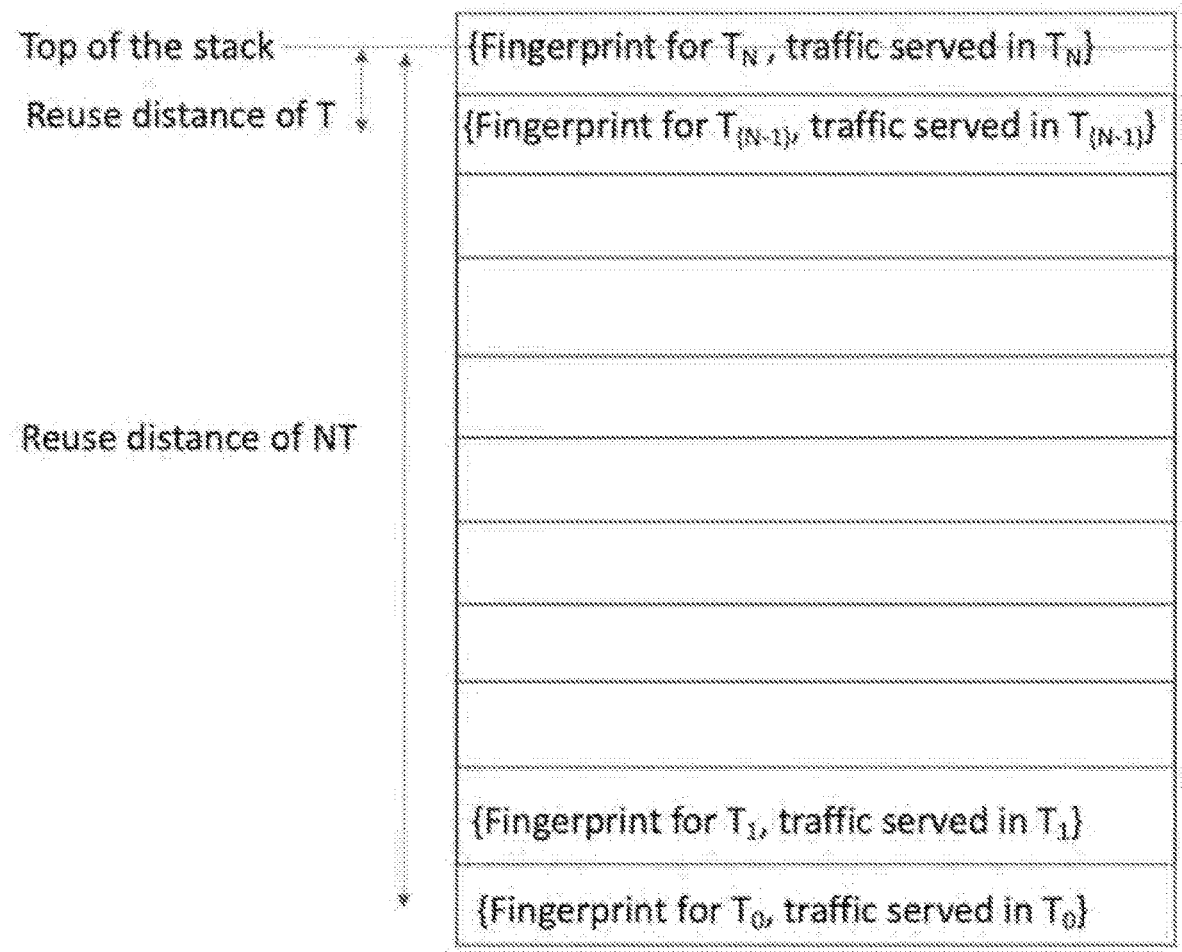
FIG. 5 is a diagram illustrating a concept for stack algorithm execution, in accord with the teachings hereof.

Fingerprint stack algorithm for a single LRU cache environment. Suppose that for every interval T, a cache writes an entry containing the fingerprint of the trace in that interval, and the requests served in that interval. We keep a stack data structure as shown in FIG. 5. Each time a new fingerprint is generated, it is pushed to the top of the stack. The stack in FIG. 5 has N+1 entries, each representing a period of duration T. With respect to the top of the stack, N distinct reuse distances, from T to N·T can be observed in the stack. Given the ability to merge fingerprint sequences, one can compute the unique object count for each of the reuse distances. Reuse distance can be considered as the eviction age of the cache and the unique object count as the size of the cache. The algorithm shown in FIGS. 5-6 computes N {eviction age, cache size, miss rate} triples from this stack.

Figure 7:
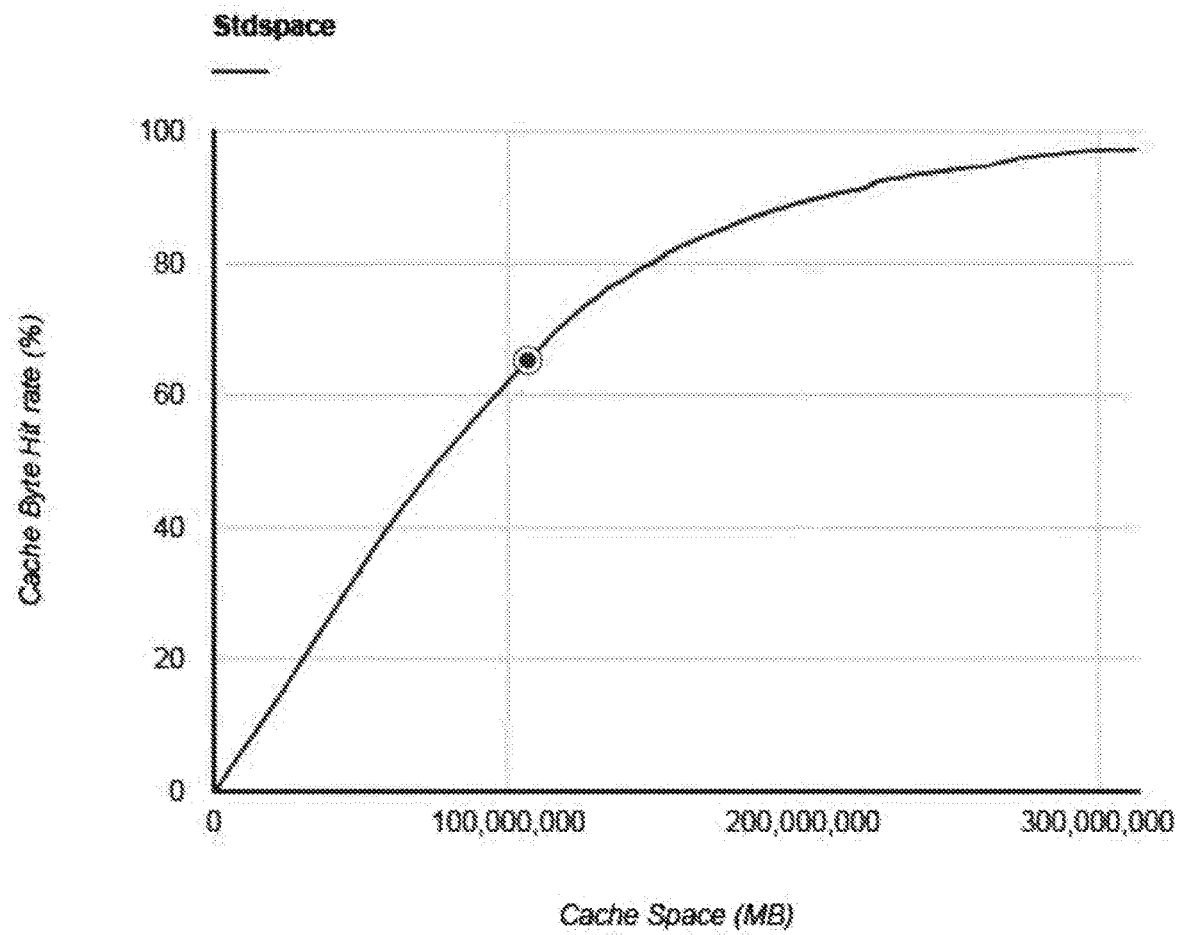
Figure 8:
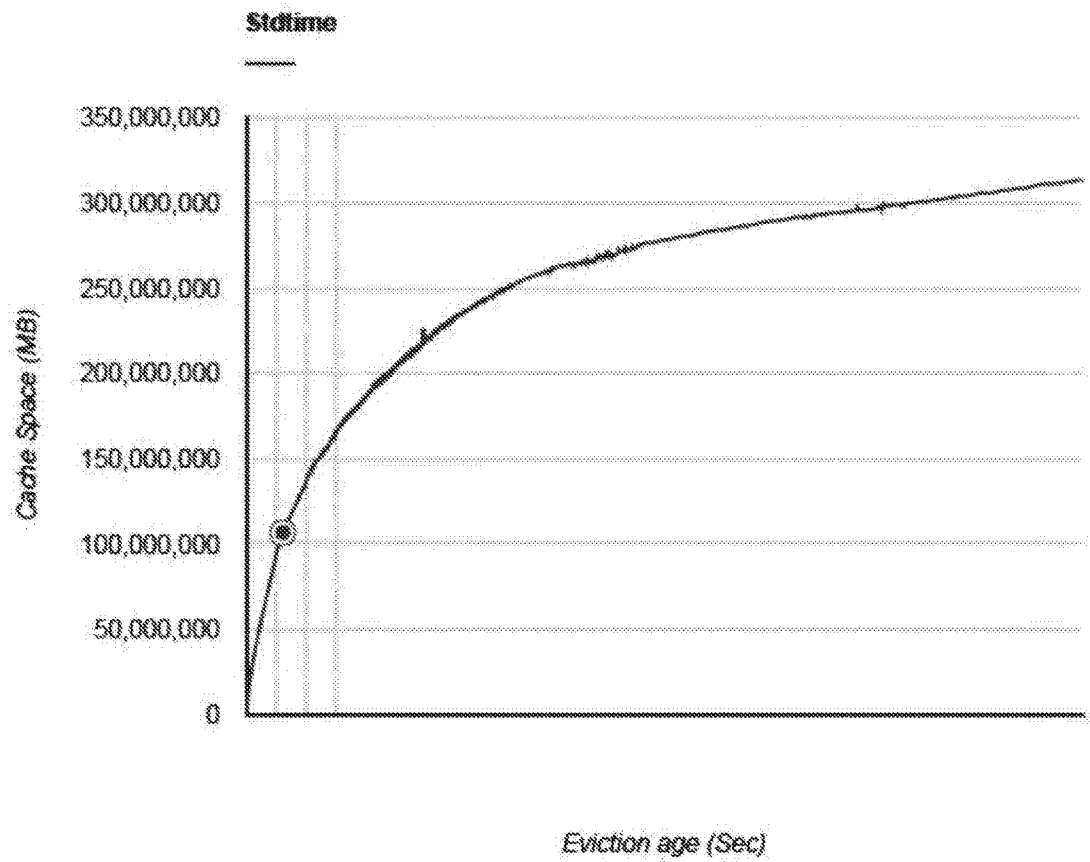
FIG. 8 is an example of a graph showing the relationship between cache space and eviction age, in connection with a footprint descriptor, and mentioning how a chosen cache space point can be related to an eviction age (FIG. 8) and a hitrate (FIG. 7)

After each time interval T, a new fingerprint is added on top of the stack, and this algorithm is run, which prints a set of triples. Using this collection of triples accumulated over time, one can develop a function mapping between three domains (eviction age, cache size, miss rate) and can be represented as a lookup table. This method can be seen as a discretized version of all possible reuse distances method described in [Sundarajjan et al.]. FIGS. 7 and 8 show examples of footprint descriptors in terms of offload vs. cache capacity (stdspace) and offload vs. eviction age (stdtime). Hence, the footprint descriptor is a succinct representation of the cache requirements of a cache sequence, the footprint descriptor relates offloading (cache hit or miss ratio) to eviction age and to cache capacity.

It is also noted that one can plot the joint probability distribution that expresses miss rate as a function of cache size and eviction age in a generalized fashion, likewise to the approach described in [Sundarajan et al.].

The inner loop that merges the fingerprints of a reuse sequence is computationally the most expensive part of the algorithm. The algorithm can be easily modified to work in an incremental fashion. In the incremental version of this algorithm, fingerprint2 computed in each iteration of the outer loop can be saved to disk. After time interval T, the algorithm is invoked again after adding the newest fingerprint on top of the stack. In this invocation, the inner loop may be skipped and the value of fingerprint1 can be loaded from a file saved on disk in the previous run of the algorithm. In this case, one doesn't even need to maintain the stack, and can entirely work off the saved files. Whether one wants to work with a stack or with the saved files depends on the application context. For periodic computation jobs, where it is certain that a footprint descriptor is definitely needed to be computed at a fixed point in the future, it makes sense to create the saved files. For on-demand situations, it makes sense to keep the raw fingerprints on disk, and run the stack algorithm only when a footprint descriptor computation is requested.

Although this is a stack algorithm, it is different than the prior known stack-distance algorithm [Sundarajjan et al.]. as follows:

1. Prior known stack-distance algorithm has no concept of time. The stack contains objects and there are no duplicates in the stack. Therefore the distance between any two points in the stack is equal to the count of unique objects between those two points. The modified stack-distance algorithm used in footprint descriptors computation does introduce the notion of time in the stack-distance algorithm, but time is not involved in ordering the entries on the stack. The stack in the fingerprint stack algorithm is ordered in time order. The distance between two entries is equal to the time interval between them. The count of unique objects accessed in that interval is not immediately available from the entries in the stack. A step of fingerprint merging is required before the unique object count is known.
2. The modified stack-distance algorithm keeps track of reuse distances that have actually occurred in the trace. This forms a subset of all possible reuse distances that could have happened. The fingerprint stack algorithm tracks all possible reuse distances, although at a discretized time granularity.
3. Prior stack-distance algorithm needs constant stack maintenance. Each time a request is seen for an object that is in the stack, it is removed from its position in the stack and placed on top. The fingerprint stack algorithm has no maintenance needs.

Extension to Local Cache Pre-Positioning

The teachings presented above can be extended to better understand and improve the cache utilization of a hot object cache in a cache server. As those skilled in the art recognize, a hot object cache is a cache space, typically in RAM, for storing objects that are frequently requested. This cache space can be accessed more quickly than disk, for example.

In this case, the fingerprint will reflect the number of unique objects that were requested by clients and were not located in the hot object cache (HOC), meaning that the object had to be fetched either from disk (or elsewhere). This can be thought of as a cache "miss" in the HOC. The maximum possible HOC hit rate can be calculated just as explained above, and the HOC utilization calculated. This metric can be used to size the HOC cache to achieve a desired offload. This metric can also be compared across cache servers. For example, the fingerprints for two machines can be merged to see if the HOC (or the disk) is caching duplicate content. If so, then the redundant objects could be deleted from one machine, and requests for such objects be routed to the other machine, thus saving cache space while maintaining cache hit ratio.

Generalizing, a cache server can maintain multiple levels of cache, such as a first level cache in RAM for "hot" objects, a second level cache on SSD, and third level cache on disk (these are just examples). Using the teachings hereof, a fingerprint can be captured for each level of cache over a given time period. In this case, a cache "miss" can mean going forward to the next level in the cache. Then, the fingerprints can be merged to understand the optimal object placement in which level and optimal relative sizing of each level.

Computer Based Implementation

The teachings hereof may be implemented using conventional computer systems, but modified by the teachings hereof, with the components and/or functional characteristics described above realized in special-purpose hardware, general-purpose hardware configured by software stored therein for special purposes, or a combination thereof, as modified by the teachings hereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 9:
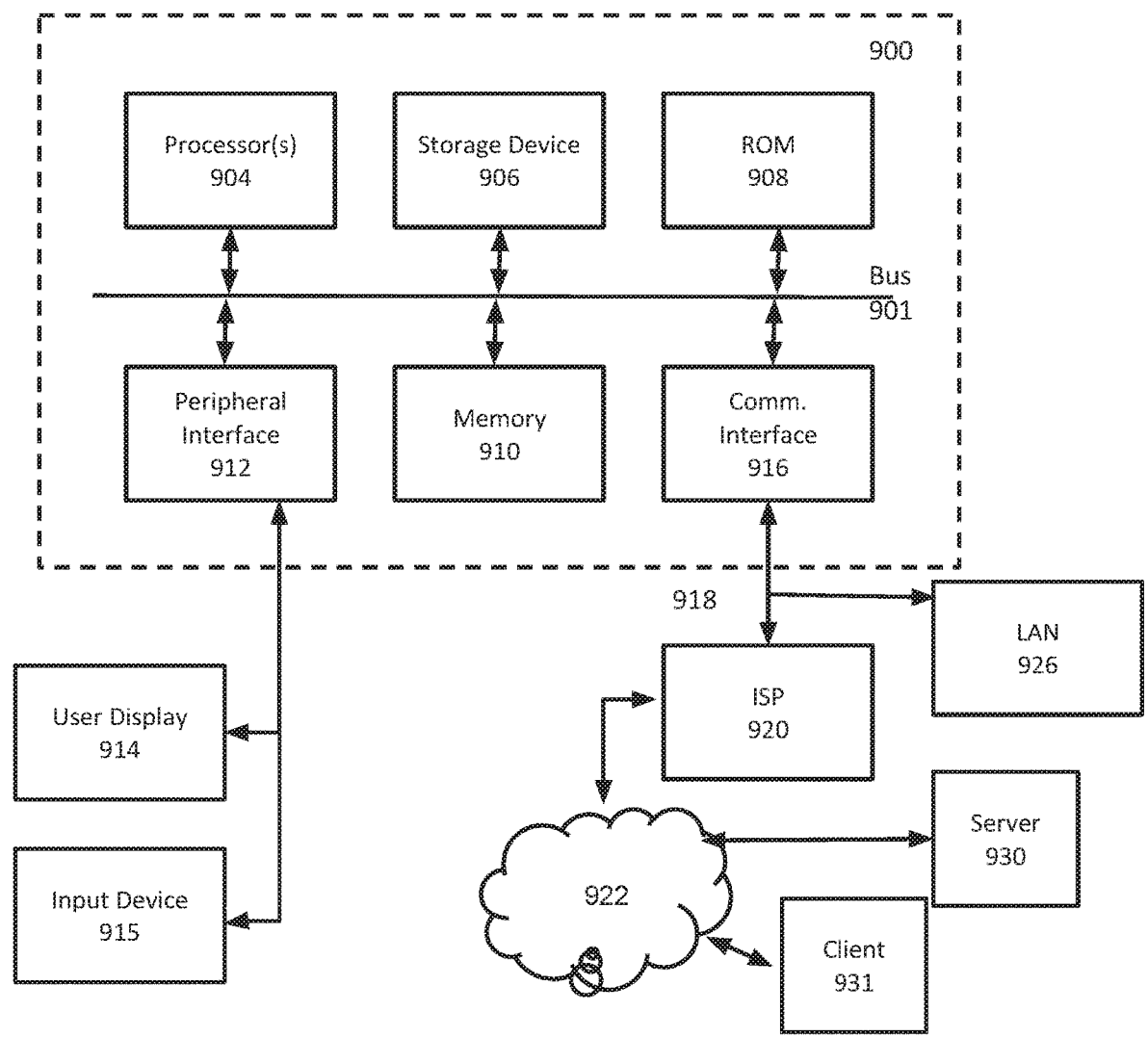
FIG. 9 is a block diagram illustrating hardware in a computer system that may be used to implement the teachings hereof.

FIG. 9 is a block diagram that illustrates hardware in a computer system 900 upon which such software may run in order to implement embodiments of the invention. The computer system 900 may be embodied in a client device, server, personal computer, workstation, tablet computer, mobile or wireless device such as a smartphone, network device, router, hub, gateway, or other device. Representative machines on which the subject matter herein is provided may be a computer running a Linux or Linux-variant operating system and one or more applications to carry out the described functionality.

Computer system 900 includes a microprocessor 904 coupled to bus 901. In some systems, multiple processor and/or processor cores may be employed. Computer system 900 further includes a main memory 910, such as a random access memory (RAM) or other storage device, coupled to the bus 901 for storing information and instructions to be executed by processor 904. A read only memory (ROM) 908 is coupled to the bus 901 for storing information and instructions for processor 904. A non-volatile storage device 906, such as a magnetic disk, solid state memory (e.g., flash memory), or optical disk, is provided and coupled to bus 901 for storing information and instructions. Other application-specific integrated circuits (ASICs), field programmable gate arrays (FPGAs) or circuitry may be included in the computer system 900 to perform functions described herein.

A peripheral interface 912 may be provided to communicatively couple computer system 900 to a user display 914 that displays the output of software executing on the computer system, and an input device 915 (e.g., a keyboard, mouse, trackpad, touchscreen) that communicates user input and instructions to the computer system 900. However, in many embodiments, a computer system 900 may not have a user interface beyond a network port, e.g., in the case of a server in a rack. The peripheral interface 912 may include interface circuitry, control and/or level-shifting logic for local buses such as RS-485, Universal Serial Bus (USB), IEEE 1394, or other communication links.

Computer system 900 is coupled to a communication interface 916 that provides a link (e.g., at a physical layer, data link layer,) between the system bus 901 and an external communication link. The communication interface 916 provides a network link 918. The communication interface 916 may represent an Ethernet or other network interface card (NIC), a wireless interface, modem, an optical interface, or other kind of input/output interface.

Network link 918 provides data communication through one or more networks to other devices. Such devices include other computer systems that are part of a local area network (LAN) 926. Furthermore, the network link 918 provides a link, via an internet service provider (ISP) 920, to the Internet 922. In turn, the Internet 922 may provide a link to other computing systems such as a remote server 930 and/or a remote client 931. Network link 918 and such networks may transmit data using packet-switched, circuit-switched, or other data-transmission approaches.

In operation, the computer system 900 may implement the functionality described herein as a result of the processor executing code. Such code may be read from or stored on a non-transitory computer-readable medium, such as memory 910, ROM 908, or storage device 906. Other forms of non-transitory computer-readable media include disks, tapes, magnetic media, SSD, CD-ROMs, optical media, RAM, PROM, EPROM, and EEPROM, flash memory. Any other non-transitory computer-readable medium may be employed. Executing code may also be read from network link 918 (e.g., following storage in an interface buffer, local memory, or other circuitry).

It should be understood that the foregoing has presented certain embodiments of the invention but they should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that any trademarks appearing herein are the property of their respective owners and used for identification and descriptive purposes only, and not to imply endorsement or affiliation in any way.

The invention claimed is:

1. A method for calculating offload associated with cacheable objects delivered by one or more cache servers for a content provider, the method comprising:

with the one or more cache servers in a content delivery network, receiving client requests for the cacheable objects associated with one or more hostnames associated with a content provider;

generating, with respect to a configured time period: (i) one or more statistics indicating how often the one or more cache servers had to contact another server due to cache misses for a plurality of the cacheable objects requested by clients during the configured time period, and (ii) an estimate of the number of unique cacheable objects amongst the plurality of the cacheable objects requested by clients that resulted in contacting the another server due to cache misses in (i);

based at least on the one or more statistics from (i), calculating an observed origin offload for the configured time period;
based at least on the estimate from (ii), calculating a maximum possible offload for the configured time period; and,
providing the observed origin offload and the maximum possible offload for comparison in any of: user interface and an analytical tool;
wherein the one or more statistics in (i) comprises a count, C, of a total number of client requests for the cacheable objects during the configured time period, and the maximum possible origin offload is calculated by:

$$\frac{C-E}{C}$$

where E is the estimate from (ii).

2. The method of claim 1, further comprising:
tracking a first number of cache misses in (i) that were due to time to live (TTL) expiration of the plurality of cacheable objects present in a local cache of the one or more cache servers; and,
tracking a second number of cache misses in (i) that were due to absence of the plurality of cacheable objects in the local cache of the one or more cache servers; and,
providing the first and second numbers for comparison at any of the user interface and the analytical tool, to determine how to improve the observed origin offload so as to approach the maximum possible origin offload.

3. The method of claim 1, wherein the one or more cache servers comprise: a first cache server and a second cache server, producing a respective first and second estimates as specified in (ii), and further comprising:
merging the first and second estimates to generate the estimate used to calculate the maximum possible origin offload for the configured time period.

4. A method for calculating offload associated with cacheable objects delivered by one or more cache servers for a content provider, the method comprising:
with the one or more cache servers in a content delivery network, receiving client requests for the cacheable objects associated with one or more hostnames associated with a content provider;
generating, with respect to a configured time period: (i) one or more statistics indicating how often the one or more cache servers had to contact another server due to cache misses for a plurality of the cacheable objects requested by clients during the configured time period, and (ii) an estimate of the number of unique cacheable objects amongst the plurality of the cacheable objects requested by clients that resulted in contacting the another server due to cache misses in (i);
based at least on the one or more statistics from (i), calculating an observed origin offload for the configured time period;
based at least on the estimate from (ii), calculating a maximum possible offload for the configured time period; and,
providing the observed origin offload and the maximum possible offload for comparison in any of: user interface and an analytical tool;
wherein the estimate in (ii) is determined by a set of steps comprising:
providing a first function that maps cache keys associated with the plurality of cacheable objects to points in a set of uniformly distributed points in a range associated with the output of the first function;
during the configured time period, upon observing a forward request for a particular cacheable object of the plurality of cacheable objects, obtaining the corresponding mapped point for the particular cacheable object, where the forward request results from a cache miss for the particular cacheable object that requires contacting another server for the particular cacheable object;
maintaining a data structure storing the K-th sized mapped point associated with the forward requests during the configured time period, K being a configured value; and,
generating the estimate of the number of unique cacheable objects associated with the forward requests during the configured time period, at least by applying a second function to the K-th sized mapped point.

5. The method of claim 4, wherein the another server comprises an origin server.

6. The method of claim 4, wherein the first function comprises a hash function.

7. The method of claim 4, wherein the range for the first function comprises the interval: [0, 1].

8. The method of claim 4, wherein applying the second function comprises solving for the estimate of the number of unique cacheable objects, N, in the following expression:

$$\frac{K}{N+1} = V_k$$

in which $V_k$ is the value of K-th sized mapped point.

9. The method of claim 4, wherein the data structure is stored locally in at least one of the one or more cache servers, and the generation of the estimate comprises collecting and merging contents of data structures from a plurality of cache servers.

10. The method of claim 4, wherein the value of K-th sized mapped point is the K-th smallest point.

* * * * *